United States Patent
Lord et al.

(10) Patent No.: US 7,784,090 B2
(45) Date of Patent: Aug. 24, 2010

(54) SYSTEMS AND METHODS FOR DISPENSING POSTAGE STAMPS

(75) Inventors: Daniel J. Lord, Upper Marlboro, MD (US); Roy R. Gordon, Gaithersburg, MD (US); Wayne A. Wilkerson, Manassas, VA (US)

(73) Assignee: United States Postal Service, Washington, DC (US)

( * ) Notice: Subject to any disclaimer, the term of this patent is extended or adjusted under 35 U.S.C. 154(b) by 1569 days.

(21) Appl. No.: 10/468,811

(22) PCT Filed: Feb. 25, 2002

(86) PCT No.: PCT/US02/03400

§ 371 (c)(1),
(2), (4) Date: Jun. 13, 2004

(87) PCT Pub. No.: WO02/068203

PCT Pub. Date: Sep. 6, 2002

(65) Prior Publication Data

US 2004/0215581 A1   Oct. 28, 2004

Related U.S. Application Data (60) Provisional application No. 60/270,621, filed on Feb. 23, 2001.

(51) Int. Cl.
*G06F 21/00*   (2006.01)
*G07B 17/02*   (2006.01)
*B65B 35/00*   (2006.01)

(52) U.S. Cl. .............................. 726/7; 726/18; 705/60; 705/64; 705/401

(58) Field of Classification Search .................. None
See application file for complete search history.

(56) References Cited

U.S. PATENT DOCUMENTS

| 4,812,994 | A | * | 3/1989 | Taylor et al. ................. 705/410 |
| 4,864,618 | A |   | 9/1989 | Wright et al. |
| 5,706,427 | A | * | 1/1998 | Tabuki ........................ 726/5 |
| 5,726,894 | A | * | 3/1998 | Sansone ..................... 705/408 |
| 5,778,076 | A | * | 7/1998 | Kara et al. ..................... 380/51 |
| 5,796,834 | A | * | 8/1998 | Whitney et al. ............... 705/60 |

(Continued)

FOREIGN PATENT DOCUMENTS

GB   2211144 A   *   6/1989

(Continued)

OTHER PUBLICATIONS

Intellectual Property Office of New Zealand, Letters Patent, dated Aug. 11, 2005 (1 page).

(Continued)

*Primary Examiner*—Christopher A Revak
(74) *Attorney, Agent, or Firm*—Finnegan, Henderson, Farabow, Garrett & Dunner, LLP (57) ABSTRACT

Postage stamps are dispensed by receiving payment from a customer for a postage value at a point of sale terminal. The point of sale terminal requests and receives an authorization key from an authorization system. The authorization key is provided to the customer. Thereafter, the customer provides the authorization key to a postage dispensing machine, which provides postage stamps equivalent to the postage value.

23 Claims, 7 Drawing Sheets

U.S. PATENT DOCUMENTS

| | | | |
|---|---|---|---|
| 5,796,841 A * | 8/1998 | Cordery et al. | 380/55 |
| 5,841,970 A * | 11/1998 | Tabuki | 726/2 |
| 5,917,924 A * | 6/1999 | Herbert | 382/101 |
| 5,923,406 A * | 7/1999 | Brasington et al. | 355/40 |
| 5,987,232 A * | 11/1999 | Tabuki | 726/5 |
| 6,005,945 A * | 12/1999 | Whitehouse | 380/51 |
| 6,466,921 B1 * | 10/2002 | Cordery et al. | 705/60 |
| 6,480,831 B1 * | 11/2002 | Cordery et al. | 705/60 |
| 6,567,794 B1 * | 5/2003 | Cordery et al. | 705/60 |
| 6,584,309 B1 * | 6/2003 | Whigham | 455/414.1 |
| 6,619,544 B2 * | 9/2003 | Bator et al. | 235/381 |
| 6,839,691 B2 * | 1/2005 | Bator et al. | 705/59 |
| 7,035,832 B1 * | 4/2006 | Kara | 705/408 |
| 7,203,666 B1 * | 4/2007 | Gravell et al. | 705/401 |
| 7,226,494 B1 * | 6/2007 | Schwartz et al. | 75/401 |
| 7,257,558 B2 * | 8/2007 | Schwartz et al. | 705/62 |
| 7,433,849 B2 * | 10/2008 | Cordery et al. | 705/401 |
| 2001/0042052 A1 | 11/2001 | Leon | |
| 2002/0046193 A1 * | 4/2002 | Bator et al. | 705/401 |
| 2002/0046195 A1 | 4/2002 | Martin et al. | |
| 2002/0107791 A1 * | 8/2002 | Nobrega et al. | 705/39 |
| 2003/0217017 A1 * | 11/2003 | Willoughby et al. | 705/404 |
| 2004/0088551 A1 * | 5/2004 | Dor et al. | 713/182 |
| 2005/0065892 A1 * | 3/2005 | Ryan et al. | 705/62 |
| 2006/0190732 A1 * | 8/2006 | Fery et al. | 713/176 |

FOREIGN PATENT DOCUMENTS

| | | |
|---|---|---|
| JP | 2001-344464 | 12/2001 |
| NZ | 527813 | 8/2005 |

OTHER PUBLICATIONS

Intellectual Property Office of New Zealand, Examination Report, dated Mar. 11, 2005 (1 page).

Intellectual Property Office of New Zealand, Examination Report, dated Nov. 20, 2003 (1 page).

International Preliminary Examining Authority, PCT Notification of Transmittal of the International Search Report or the Declaration, dated Feb. 25, 2003 (5 pages).

Australian Government, Examiner's First Report, dated Nov. 21, 2006 (2 pages).

Australian Government, letter re lapse of application, dated Sep. 3, 2008 (1 page).

Canadian Intellectual Property Office, Notice of Abandonment, dated Apr. 22, 2009 (1 page).

* cited by examiner

SYSTEMS AND METHODS FOR DISPENSING POSTAGE STAMPS

CROSS REFERENCE TO RELATED APPLICATION

This application claims the priority benefit of U.S. Provisional Application No. 60/270,621, filed on Feb. 23, 2001, which is incorporated herein by reference.

FIELD

The present invention relates generally to systems and methods for dispensing postage stamps. More particularly, the present invention relates to systems and methods for securely and economically dispensing postage stamps.

BACKGROUND

Presently, retailers that sell postage stamps store the postage stamps at point of sale terminals for customers to purchase. This practice may be undesirable because of the space required to store the postage stamps.

As an alternative to providing postage stamps at point of sale terminals, stores may provide postage stamp vending machines for customers to purchase postage stamps. However, postage stamp vending machines have their disadvantages too. Postage stamp vending machines must be stocked with both money and postage stamps, increasing the security risks to the machines due to the stored money and postage stamps. Further, postage stamp vending machines may be costly due to the additional hardware and/or software required to process money received and dispensed by the vending machines. Still further, postage stamp vending machines may require frequent servicing due to their intricate mechanical design.

Accordingly, there is a need for space efficient, secure, and inexpensive systems and methods for dispensing postage stamps.

SUMMARY

In accordance with the invention, there is provided a method for dispensing postage stamps. The method comprises receiving payment from a customer for a postage value at a point of sale terminal. The method further comprises requesting and receiving an authorization key from an authorization system and providing the authorization key to the customer. Still further, the method comprises providing postage stamps equivalent to the postage value from a postage dispensing machine when the authorization key is provided to the postage dispensing machine.

Further, in accordance with the invention, there is provided a system for dispensing postage stamps. The system comprises means for receiving payment from a customer for a postage value at a point of sale terminal. The system further comprises means for requesting and receiving an authorization key from an authorization system and means for providing the authorization key to the customer. Still further, the system comprises means for providing postage stamps equivalent to the postage value from a postage dispensing machine when the authorization key is provided to the postage dispensing machine.

Still further, in accordance with the invention, there is provided a computer readable medium containing instructions for controlling a computer system to perform a method. The method comprises prompting for payment from a customer a postage value at a point of sale terminal. The method further comprises requesting and receiving an authorization key from an authorization system and providing the authorization key to the customer. There is also provided a computer readable medium containing instructions for controlling a computer system to provide postage stamps equivalent to a postage value from a postage dispensing machine when an authorization key is provided to the postage dispensing machine, wherein payment of the postage value is received from a customer at a point of sale terminal and the authorization key is received from an authorization system and provided to the customer.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments consistent with the invention and together with the description, serve to explain the principles of the invention.

DESCRIPTION OF THE EMBODIMENTS

Reference will now be made in detail to the present exemplary embodiments, examples of which are illustrated in the accompanying drawings. Wherever possible, the same reference numbers will be used throughout the drawings to refer to the same or like parts.

Figure 1:
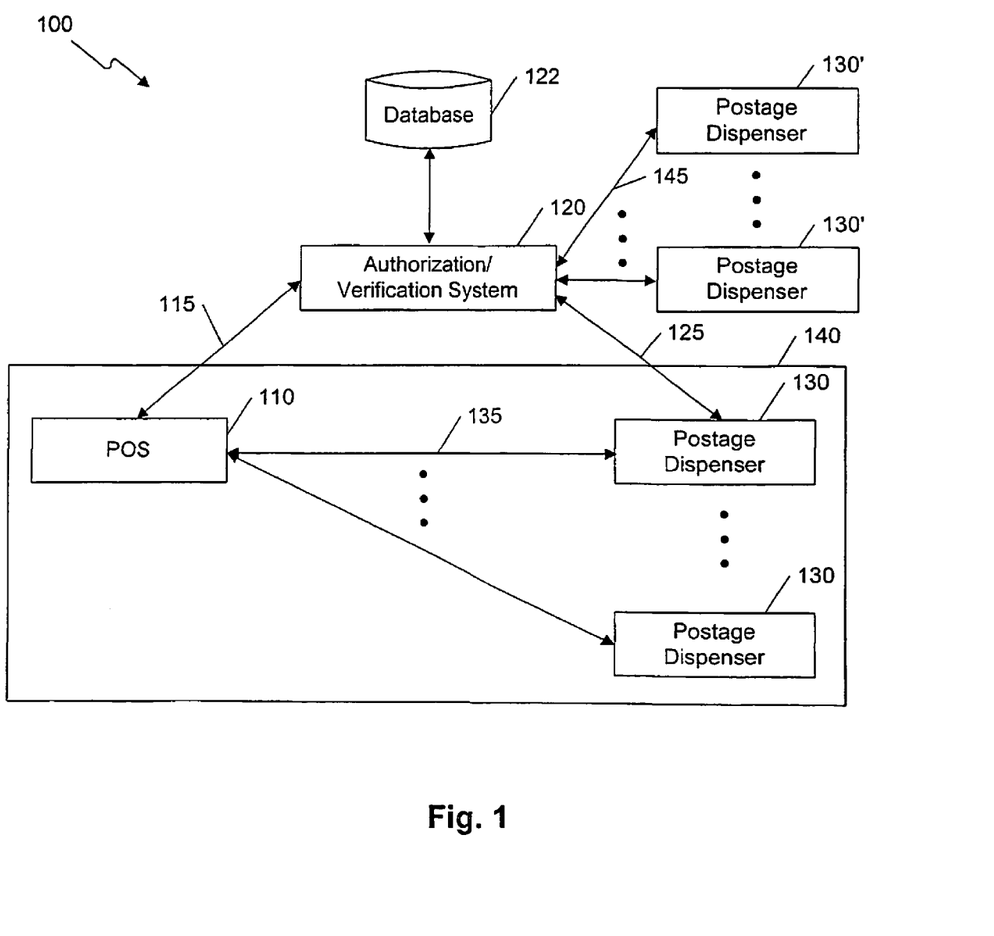
FIG. 1 illustrates a system for dispensing postage stamps consistent with the present invention.

FIG. 1 illustrates a system 100 for dispensing postage stamps consistent with the present invention. System 100 comprises a point of sale (POS) terminal 110, an authorization/verification system 120, and one or more in-store postage dispensers 130. POS terminal 110 and postage dispensers 130 may be located on the same premises 140 of a business, such as a retail store, a discount store, a grocery store, or any other business that provides products or services to consumers. POS terminal 110 may be located at a checkout counter while the one or more postage dispensers 130 may be located in an area between POS terminal 110 and an exit, for example.

System 100 may further comprise one or more stand-alone postage dispensers 130'. A stand-alone postage dispenser 130' may be any postage dispenser other than in-store postage dispensers 130. Accordingly, stand-alone postage dispersers 130' may be located at a home, an office, a post office, a business, or any other place. For example, another in-store postage dispenser located on a premise other than premise 104 may be considered a stand-alone postage dispenser 130' with respect to premise 104.

Still further, system 100 may comprises an additional authorization/verification system (not shown) for redundancy. The additional authorization/verification system may be provided at a geographically separate location from authorization/verification system 120.

POS terminal 110 and authorization/verification system 120 may communicate via a connection 115. POS terminal 110 and authorization/verification system 120 may each comprise a modem, network interface card, or any other interface (e.g. a higher-speed cable or DSL modem or ISDN terminal adapter) to adapt the point of sale terminal 110 and authorization/verification system 120 to the connection 115.

Connection 115 may be any system, network, or device that facilitates communication (e.g., data communication or telecommunication) between the point of sale terminal 110 and authorization/verification system 120 using any appropriate communication protocol (e.g., TCP/IP, HTTP, HTTPS or any other security protocol, FTP, SMTP, or any other proprietary protocol). Connection 115 may comprise a local area network (LAN) connection, a wide area network (WAN) connection, an Internet connection, or a combination of the foregoing. Connection 115 may comprise a telephone line, optical fiber, coaxial cable, twisted wire pair, or a combination of the foregoing. Connection 115 may be wireless using any technique to provide wireless transmission including infrared line of sight, cellular, microwave, satellite, packet radio, spread spectrum, or a combination of the foregoing.

Further, as shown in FIG. 1, authorization/verification system 120 and postage dispensers 130 may communicate via a connection 125. Authorization/verification system 120 and each of postage dispensers 130 may comprise a modem, network interface card, or any other interface to adapt authorization/verification system 120 and each of postage dispensers 130 to the connection 125. Connection 125 may be any mechanism that facilitates communication between authorization/verification system 120 and postage dispensers 130 using any appropriate communication protocol. Similarly, authorization/verification system 120 and postage dispensers 130' may communicate via a connection 145. Authorization/verification system 120 and each of postage dispensers 130' may comprise a modem, network interface card, or any other interface to adapt authorization/verification system 120 and each of t postage dispensers 130 to connection 145. Connection 145 may be any mechanism that facilitates communication between authorization/verification system 120 and postage dispensers 130' using any appropriate communication protocol.

Still further, as shown in FIG. 1, POS terminal 110 and in-store postage dispensers 130 may communicate via connection 135. POS terminal 110 and each of postage dispensers 130 may comprise a modem, network interface card, or any other interface to adapt POS terminal 110 and each postage dispensers 130 to connection 135. Connection 135 may be any mechanism that facilitates communication between POS terminal 110 and in-store postage dispensers 130 using any appropriate communication protocol.

Figure 2:
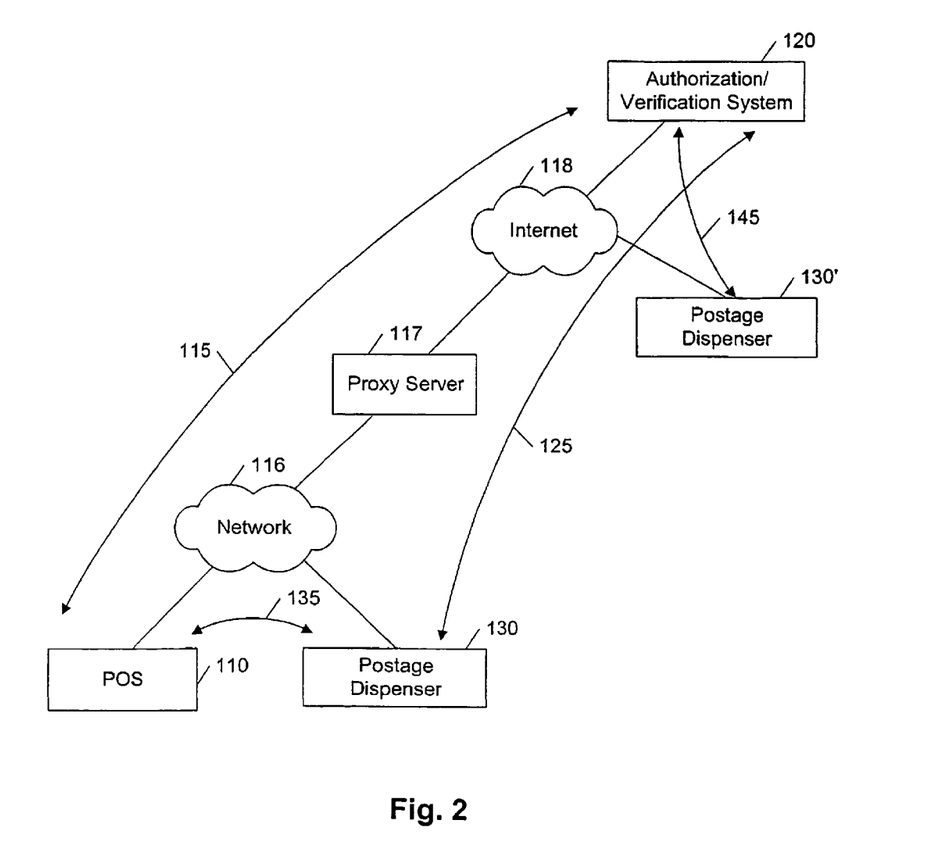
FIG. 2 illustrates connections consistent with the present invention.

FIG. 2 illustrates connections 115, 125, 135, 145 consistent with the present invention. As shown in FIG. 2, connection 115 may comprise a network connection via a network 116 and an Internet connection via the Internet 118. A firewall (e.g., a proxy server) 117 may interconnect network 116 and Internet 118. Similarly, connection 125 may comprise a network connection via network 116 and an Internet connection via Internet 118. Connection 135 may comprise a network connection via network 116. Connection 145 may comprise an Internet connection via Internet 118.

Figure 3:
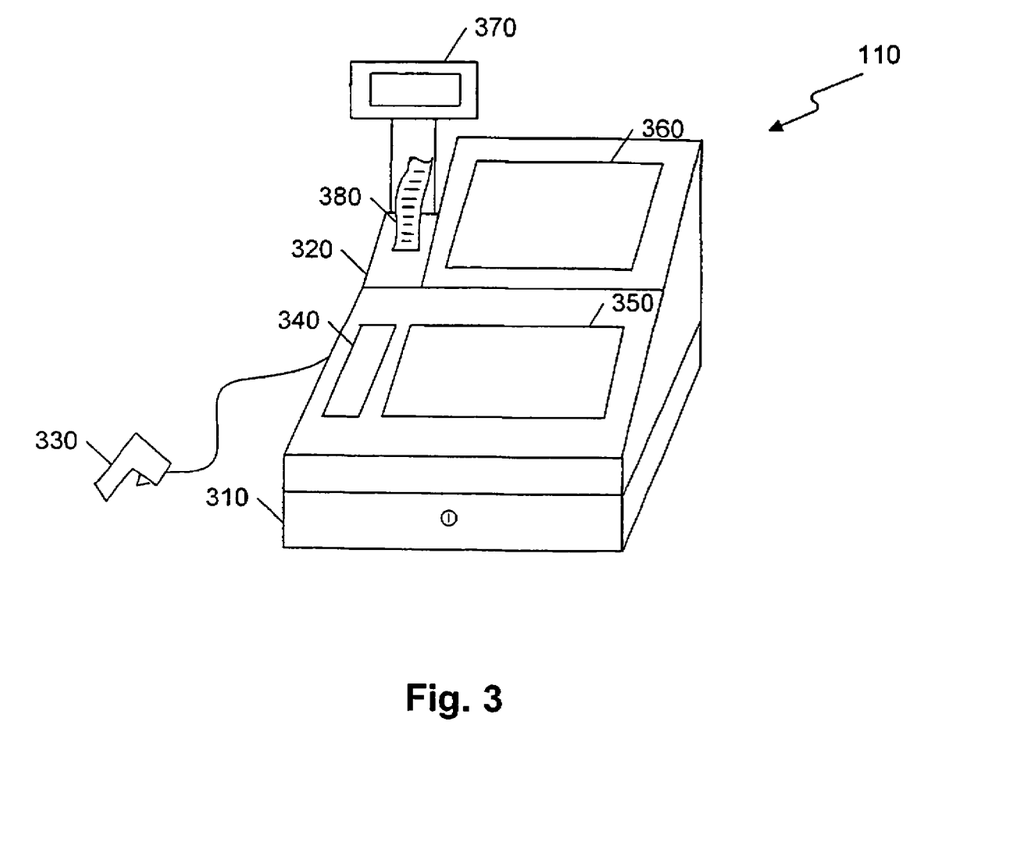
FIG. 3 illustrates a POS terminal consistent with the present invention.

FIG. 3 illustrates a POS terminal 110 consistent with the present invention. POS terminal 110 may comprise a cash drawer 310, a receipt printer 320, a barcode scanner 330, a magnetic strip reader 340, a keyboard 350, a cashier display 360, and a customer display 370. POS terminal 110 may also include a processor (not shown) comprising computer instructions for implementing embodiments consistent with the present invention. As discussed above, POS terminal 110 may further comprise a modem, network interface card, or any other interface to adapt POS terminal 110 to connection 115, 135.

Figure 4:
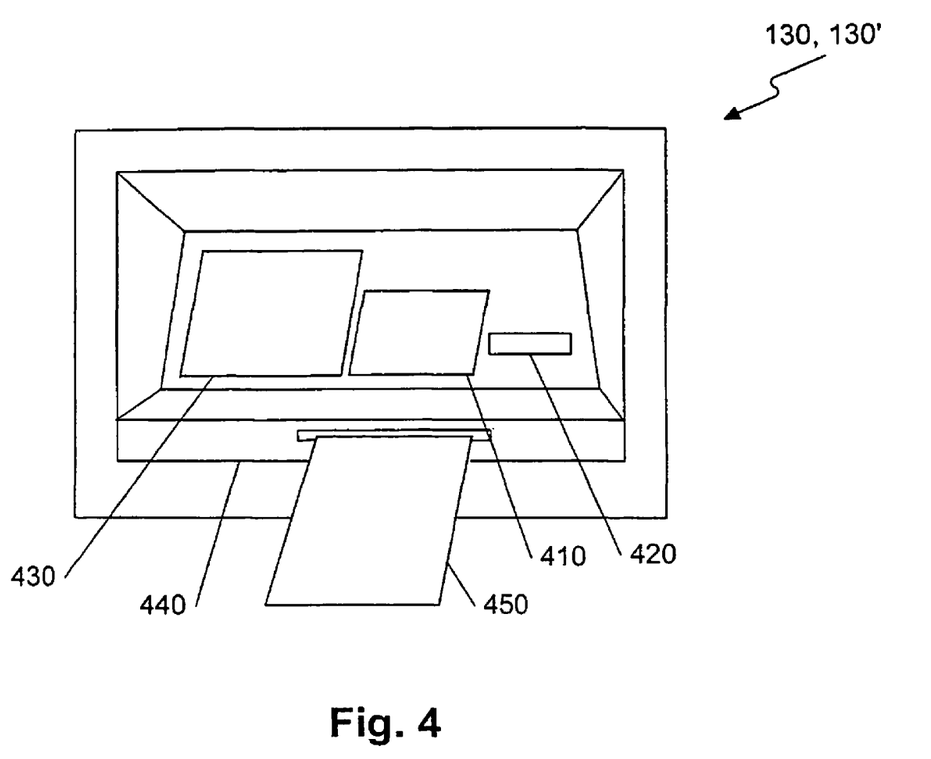
FIG. 4 illustrates a postage stamp dispenser consistent with the present invention.

FIG. 4 illustrates a postage stamp dispenser 130, 130' consistent with the present invention. Postage dispenser 130, 130' may comprise a keypad 410, a scanner 420, a display screen 430, and a printer 440. Postage dispenser 130, 130' also may also include a processor (not shown) comprising computer instructions for implementing embodiments consistent with the present invention. As discussed above, postage dispenser 130, 130' may further comprise a modem, network interface card, or any other interface to adapt postage dispenser 130, 130' to connection 125, 135, 145. Postage stamp dispenser 130, 130' may be provided in a kiosk.

Figure 5:
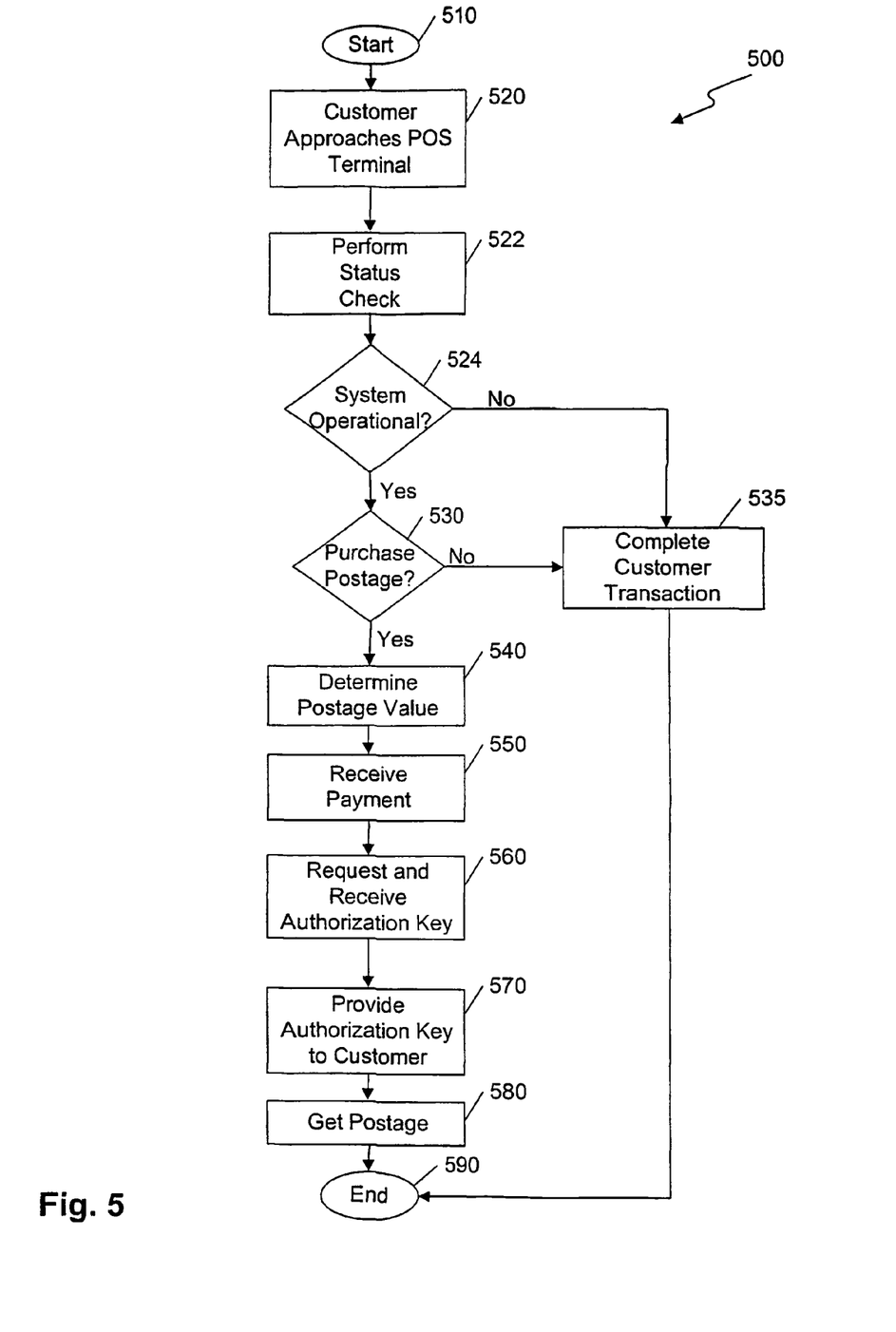
FIG. 5 illustrates a method of dispensing postage stamps consistent with the present invention.

FIG. 5 illustrates a method 500 of dispensing postage stamps consistent with the present invention. At stage 520, a customer approaches POS terminal 110. The customer may approach POS terminal 110 to purchase products or services provided on the premises 140. At stage 522, POS terminal 110 checks the status of system 100 to determine whether system 100 is capable of dispensing postal stamps on the premises 140. For example, POS terminal 110 may check the status of the connections 115, 125, authorization/verification system 120, and the in-store postage dispensers 130. POS terminal 110 may check the status of the in-store postage dispensers 130 via the connection 135 to determine whether at least one of the in-store postage dispensers 130 is capable of providing postage stamps. A status check may indicate that one or more of postage dispensers 130 have a printer jam or are out of label stock, indicating that such postage dispensers 130 are incapable of providing postage stamps. POS terminal 110 may also determine whether at least one of postage dispensers 130 is capable of communicating with authorization/verification system 120. Postage dispensers 130 may automatically notify POS terminal 110 when a fault or out-of-label stock condition occurs.

If system 100 is incapable of providing postage stamps on the premises 140 (i.e., "No" at stage 524), then the customer transaction is completed at stage 535, for example, by scanning, bagging, and receiving payment for products or services desired to be purchased, other than postage stamps. At stage 590, the method 500 ends until the next customer approaches POS terminal 110. Alternatively, if system 100 is incapable of providing postage stamps on the premises 140, it may be determined whether the customer would like to purchase postage stamps, nevertheless. If the customer would like to purchase postage stamps despite system 100 being incapable of providing stamps on the premises 140, the customer may be able to retrieve stamps from a stand-alone postage dispenser 130'.

If system 100 is capable of providing postage stamps (i.e., "Yes" at stage 524), then at stage 530, it is determined whether the customer would like to purchase postage stamps. A cashier may make this determination by asking the customer if the customer would like to purchase postage stamps.

If the customer is at a self-service checkout counter, a display may prompt the customer to select "yes" or "no" based on whether the customer would like to purchase postage stamps.

Alternatively, prior to approaching POS terminal 110, the customer may have selected one or more postage purchase cards from a location on the premises 140. Once at POS terminal 110, the customer may present the postage purchase card to the cashier to indicate that the customer would like to purchase postage stamps. The postage purchase cards may be provided on an aisle of a store for the customer to select while shopping and/or provided near POS terminal 110 for the customer to select while waiting in a checkout line. Each postage purchase card may indicate a number, N, (e.g., 10, 20, 30, etc.) and a denomination, D, (e.g., $0.01, $0.02; $0.33, $0.57, etc.) of postage stamps to be purchased. For example, one postage purchase card may indicate 30 stamps each having a value of $0.33 to be purchased, while another postage purchase card may indicate 10 stamps each having a value of $0.01 each to be purchased. The customer selects the one or more appropriate postage purchase cards that indicate the number and denomination of postage stamps the customer desires to purchase. The postage purchase card may be a paper or plastic card having a barcode (e.g. UPC) or other machine readable code for POS terminal 110 to scan to determine the purchase value of the postage stamps desired to be purchased. Alternatively, the postage purchase card may be plastic card having a magnetic strip with the postage value encoded in the magnetic strip. As yet another alternative, the postage purchase card may be a disk, tape, or punch card. The postage value may be equal to the number, N, multiplied by the denomination, D, indicated on the postage purchase card. The postage value may also include an additional fee, such as a processing fee. However, the postage value may also include a discount such that the postage value may be less than the number, N, multiplied by the denomination, D, indicated on the postage purchase card.

If the customer indicates that no purchase is desired (i.e., "No" at stage 530), then the customer transaction is completed at stage 535, for example, by scanning, bagging, and receiving payment for products or services desired to be purchased, other than postage stamps. At stage 590, the method 500 ends until the next customer approaches POS terminal 110.

If the customer indicates that the customer wants to purchase postage stamps (i.e., "Yes" at stage 530), then the postage value is determined at stage 540. The cashier may determine the postage value by inputting via the keyboard 350 of POS terminal 110 the number, N, and the denomination, D, of the postage stamps desired. If the customer is at a self-service checkout counter, then the customer may input via an input device of POS terminal 110 the number, N, and denomination, D, of the postage stamps desired. Alternatively, the postage value may be determined by processing (e.g., scanning) the postage purchase card. As yet another alternative, the cashier may scan a laminated sheet that comprises a list of barcodes for different number, N, and denomination, D, combinations. The cashier points the scanner 330 at the appropriate list item on the laminated sheet, based on the postage stamps the customers wants to purchase.

At stage 550, a payment for the postage value is received. A cashier may receive a cash payment and store it in the cash drawer 310 of POS terminal 110. Alternatively, the cashier may receive payment by swiping a debit or credit card received from the customer through the magnetic strip reader 340 of the point of sale terminal 110. If the customer is at a self-service checkout counter, then the customer may swipe the debit or credit card through a magnetic strip reader of the point of sale terminal 110.

Once payment is received, at stage 560, POS terminal 110 requests an authorization key from authorization/verification system 120 via the connection 115. During the request, POS terminal 110 transmits the number, N, and denomination, D, of the postage stamps purchased. Authorization/verification system 120 may verify that POS terminal 110 is an authorized terminal prior to providing an authorization key to POS terminal 110 for the transaction. Authorization/verification system 120 stores the authorization key and the corresponding number, N, and denomination, D, of the postage stamps purchased in a database 122 (FIG. 1). The authorization key may be a random sequence of alphanumeric characters.

At stage 570, POS terminal 110 provides the authorization key to the customer. POS terminal 110 may print the authorization key on a receipt 380 provided for the products of services purchased by the customer or on a separate sheet of paper. Alternatively, the authorization key may be printed in a machine readable code such as a barcode or other machine readable code on the receipt. As yet another alternative, the authorization key may be provided on a plastic card, a disk, a tape, or a punch card.

Once the customer receives the authorization key, at stage 580, the customer may enter the authorization key into one of in-store postage dispensers 130 and retrieve the postage stamps. Alternatively, the customer may enter the authorization key and retrieve the postage stamps at a stand-alone postage dispenser 130'. The customer may have an unlimited time in which to retrieve the postage stamps. Alternatively, the customer may be required to retrieve the postage stamps within a predetermined time (e.g., three days) after receipt of the authorization key. If the customer does not retrieve the postage stamps within the predetermined time, authorization/verification system 120 may delete the authorization key from database 122.

Figure 6:
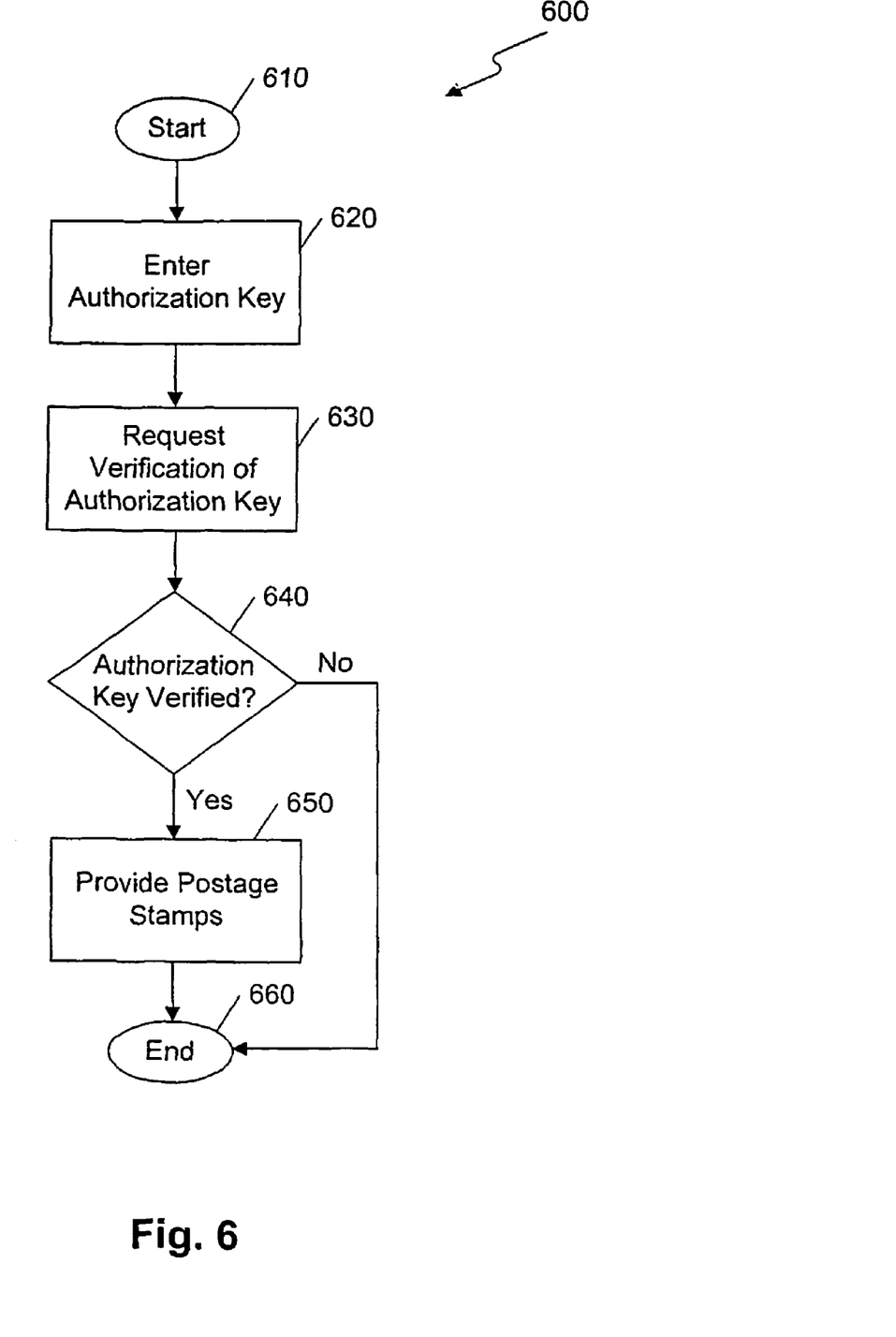
FIG. 6 illustrates stages for retrieving postage stamps consistent with the present invention.

FIG. 6 illustrates the stages for retrieving the postage stamps consistent with the present invention. At stage 620, the customer enters the authorization key into postage dispenser 130, 130'. The customer may punch in the authorization key using the keypads 410 of the dispenser 130, 130'. Alternatively, the dispenser 130, 130' may scan the machine readable code on the receipt using the scanner 420 to retrieve the authorization key. As another alternative, the dispenser 130, 130' may receive the plastic card, disk, tape, or punch card to retrieve the authorization key encoded therein.

At stage 630, postage dispenser 130, 130' requests verification of the authorization key from authorization/verification system 120 via the connection 135, 145. During the verification, postage dispenser 130, 130' transmits the authorization key to authorization/verification system 120 via the connection 135, 145. Authorization/verification system 120 may verify that postage dispenser 130, 130' is an authorized postage dispenser prior to providing a verification to postage dispenser 130, 130'. When authorization/verification system 120 receives a request for verification, authorization/verification system 120 checks database 122 to determine whether the authorization key is valid. The authorization key may be valid if it was previous provided to a POS terminal 110 and if the authorization key has not been previously verified by authorization/verification system 120. If the authorization key is valid, authorization/verification system 120 cross-references the authorization key with the number, N, and the denomination, D, of the postage stamps purchased by the customer and transmits this information to postage dispenser 130, 130'. Once authorization/verification system 120 verifies the authorization key, authorization/verification system 120 may delete the authorization key from database 122.

If the authorization key is not verified (i.e., "No" at stage 640), postage dispenser 130, 130' may prompt the customer via the display 430 that the verification attempts failed. If the authorization key is verified (i.e., "Yes" at stage 640), then postage dispenser 130, 130' provides the number, N, and denomination, D, of postage stamps purchased to the customer at stage 650. Postage dispenser 130, 130' may provide the postage stamps 480 by printing the postage stamps on blank labels stored in postage dispenser 130, 130' using the printer 440. The labels may be self-adhesive labels typically on roll or fan-fold label stock. Alternatively, postage dispenser 130, 130' may output pre-printed stamps stored in postage dispenser 130, 130'.

Figure 7:
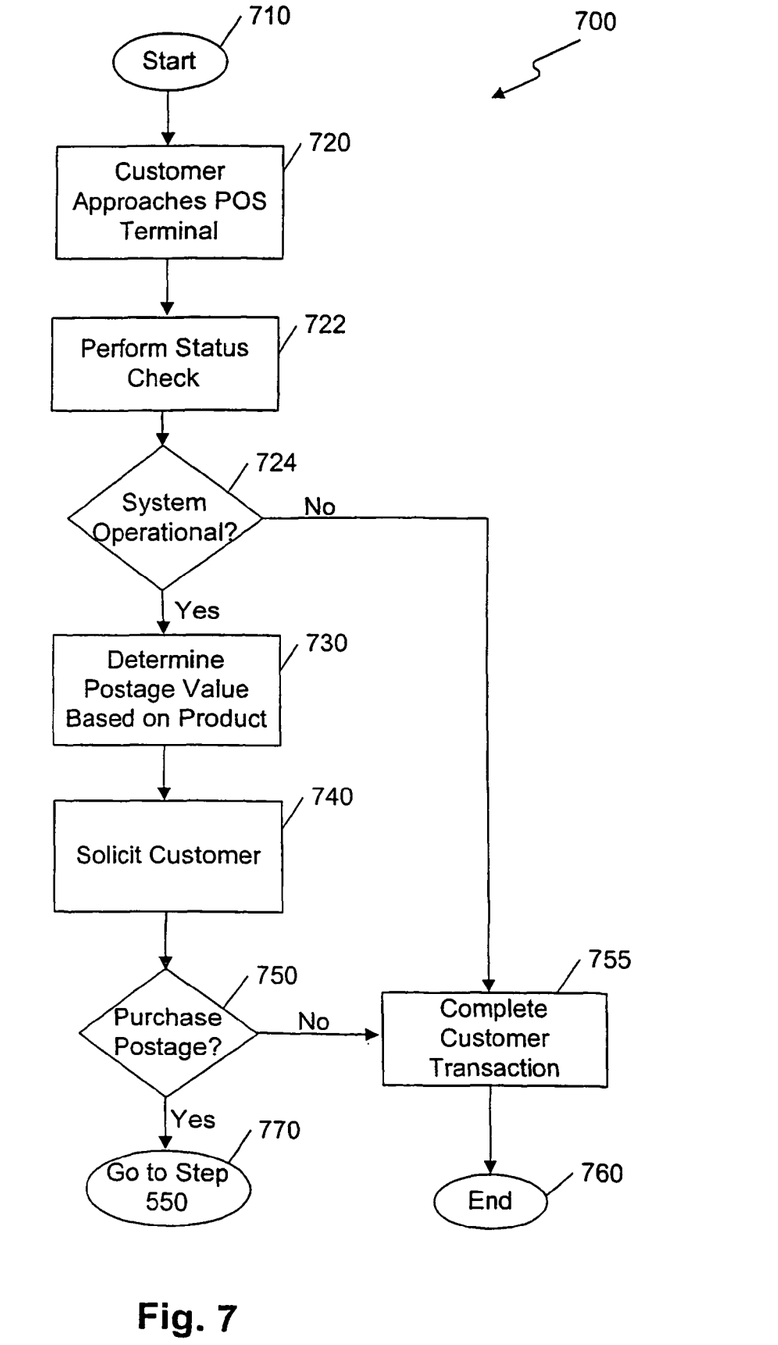
FIG. 7 illustrates a method of dispensing postage stamps consistent with the present invention.

FIG. 7 illustrates a second method 700 of dispensing postage stamps consistent with the present invention. At stage 720, a customer approaches POS terminal 110 to purchase a product. At stage 722, POS terminal 110 checks the status of system 100 to determine whether system 100 is capable of dispensing postal stamps on the premises 140. If system 100 is incapable of providing postage stamps on the premises 140 (i.e., "No" at stage 724), then the customer transaction is completed at stage 755, for example, by scanning, bagging, and receiving payment for products desired to be purchased, other than postage stamps. At stage 760, the method 700 ends until the next customer approaches POS terminal 110. Alternatively, if system 100 is incapable of providing postage stamps on the premises 140, it may be determined whether the customer would like to purchase postage stamps, nevertheless. If the customer would like to purchase postage stamps despite system 100 being incapable of providing stamps on the premises 140, the customer may be able to retrieve stamps from a stand-alone postage dispenser 130'.

If system 100 is the capable of providing postage stamps (i.e., "Yes" at stage 724), then, at stage 730, a postage value is determined based on the cost of mailing a desired product. The postage value may be determined by scanning the product to retrieve a product identification number. The product identification number may be cross-referenced in a database with a corresponding postage value. The postage value may be based on the amount of postage required to mail the product. For example, a customer may approach POS terminal 110 to purchase a greeting card. After the greeting card is scanned to determine the product identification number, the postage value may be determined by retrieving the postage value corresponding to the product identification number. This postage value may equal the postage value required to mail the greeting card.

After the postage value is determined, at stage 740, the customer may be solicited to purchase postage stamps at the postage stamps value. For example, the cashier may ask the customer if the customer is interested in purchasing postage stamps at the postage value to mail the product. Alternatively, if the customer is at a self-service checkout counter, a display may prompt the customer to select "yes" or "no" based on whether the customer would like to purchase postage stamps.

If the customer indicates that the customer would like to purchase the postage stamps (i.e., "Yes" at stage 750), then stages 550-580 in FIG. 5 are carried out. If the customer indicates that no postage is desired (i.e., "No" at stage 750), then the customer transaction is completed, at stage 755, for example, by scanning, bagging, and receiving payment for products or services desired to be purchased, other than postage stamps. At stage 760, the method ends until the next customer approaches POS terminal 110.

The systems and methods of the present invention may increase the availability of postage stamps to consumers by facilitating the purchasing of postage stamps while shopping in stores, such as, retail, and grocery stores. The systems and methods of the present invention may further reduce lines at post offices. The systems and methods of the present invention may enhance sales of products (e.g., greeting cards) at stores because of the convenience of purchasing postage stamps at a POS terminal when the products are purchased. Still further, the systems and methods of the present invention eliminate the need for cash of specific combinations of coins or tokens to insert into the postage dispenser. The systems and methods of the present invention may improve the security of the postage dispensers because the postage dispensers may not be stocked with cash or pre-printed postage stamps. Finally, the systems and methods of the present invention may be less costly than traditional vending machines, which may require additional hardware and/or software to process money received and dispensed.

Other embodiments consistent with the invention will be apparent to those skilled in the art from consideration of the specification and practice of the invention disclosed herein. For example, POS terminal 110 may communicate with authorization/verification system 120 via postage dispensers 130 instead of the connection 115. It is intended that the specification and examples be considered as exemplary only, with a true scope and spirit of the invention being indicated by the following claims.

What is claimed is:

1. A method of dispensing postage indicia comprising:
receiving payment from a customer for a postage value at a point of sale terminal;
requesting, by the point of sale terminal, an authorization key from an authorization system;
receiving, at the point of sale terminal, the authorization key from the authorization system;
providing the authorization key to the customer at the point of sale terminal;
receiving, at a postage dispensing machine, the authorization key from the customer; and
providing postage indicia equivalent to the postage value from the postage dispensing machine when the authorization key received at the postage dispensing machine is verified by the authorization system.

2. The method of claim 1, further comprising:
determining the postage value based on a non-postage product for purchase by the consumer at the point of sale terminal.

3. The method of claim 2, further comprising:
soliciting the customer to purchase postage stamps for the postage value.

4. The method of claim 1, wherein requesting an authorization key from an authorization system comprises:
sending a request electronically to the authorization system, wherein the point of sale terminal transmits to the authorization system information related to the postage value and a point of sale terminal identifier.

5. The method of claim 1, wherein providing the authorization key to the customer comprises:
printing the authorization key on a receipt at the point of sale terminal.

6. The method of claim 5, wherein providing the authorization key comprises printing machine readable code.

7. The method of claim 1, wherein the authorization key comprises a series of alphanumeric characters.

8. The method of claim 1, wherein providing postage indicia equivalent to the postage value from the postage dispensing machine when the authorization key is provided to the postage dispensing machine comprises:

transmitting, to the authorization system, information related to the authorization key received from the customer at the postage dispensing machine; and     printing postage indicia in an amount equivalent to the postage value at the postage dispensing machine when the authorization system verifies the authorization key.

9. The method of claim 1, wherein the authorization system comprises a database associating the authorization key with the number of postage indicia for which payment is received from the customer.

10. A system for dispensing postage indicia comprising:

a point of sale terminal for receiving payment from a customer for a postage value, requesting an authorization key from an authorization system, receiving the authorization key from the authorization system, and providing the authorization key to the customer; and     a postage dispensing machine for receiving the authorization key from the customer and providing postage indicia equivalent to the postage value when the authorization key received at the postage dispensing machine is verified by the authorization system.

11. The system of claim 10, wherein the point of sale terminal further comprises:

a machine for determining the postage value based on a non-postage product for purchase by the consumer at the point of sale terminal.

12. The system of claim 11, wherein the point of sale terminal further comprises:

a machine for soliciting the customer to purchase postage for the postage value.

13. The system of claim 10, wherein the point of sale terminal further comprises:

a machine for transmitting to the authorization system information related to the postage value and a point of sale terminal identifier.

14. The system of claim 10, wherein the postage dispensing machine further comprises:

a machine for printing the authorization key on a receipt.

15. The system of claim 14, wherein the postage dispensing machine further comprises a machine for printing machine readable code.

16. The system of claim 10, wherein the authorization key comprises a series of alphanumeric characters.

17. The system of claim 10, wherein the postage dispensing machine further comprises:

a machine for transmitting, to the authorization system, information related to the authorization key received from the customer at the postage dispensing machine; and     a machine for printing postage indicia in an amount equivalent to the postage value from the postage dispensing machine when the authorization system verifies the authorization key.

18. The system of claim 10, wherein the authorization system comprises a database associating the authorization key with the number of postage indicia for which payment is received from the customer.

19. A method for dispensing postage, comprising:

receiving payment from a customer for a postage value at a point of sale terminal;

obtaining, by the point of sale terminal, an authorization code for the customer from an authorization system;

receiving, at a postage dispenser, the authorization code input by the customer; and     providing postage indicia equivalent to the postage value to the customer at the postage dispenser when the authorization code is verified by the authorization system.

20. The method of claim 19, further comprising:

storing, at the authorization system, the authorization code for the customer; and     sending the authorization code for the customer to the point of sale terminal.

21. The method of claim 20, further comprising:

sending the authorization code input by the customer from the postage dispenser to the authorization system; wherein the authorization code is verified when the authorization code input by the customer matches the authorization code for the customer stored at the authorization system.

22. The method of claim 19, further comprising:

receiving a non-postage item from the customer at the point of sale terminal; and     determining the postage value at the point of sale terminal based on the non-postage item.

23. The method of claim 19, wherein the authorization system comprises a database associating the authorization key with the number of postage indicia for which payment is received from the customer.

\* \* \* \* \*